(12) United States Patent
Bizard

(10) Patent No.: US 6,218,645 B1
(45) Date of Patent: Apr. 17, 2001

(54) CONTROL DEVICE FOR AN ELECTRICAL COOKING APPLIANCE

(75) Inventor: Jean-Claude Bizard, Fontaine les Dijon (FR)

(73) Assignee: Seb S.A., Ecully (FR)

( * ) Notice: Subject to any disclaimer, the term of this patent is extended or adjusted under 35 U.S.C. 154(b) by 0 days.

(21) Appl. No.: 09/510,220

(22) Filed: Feb. 22, 2000

(30) Foreign Application Priority Data

Feb. 19, 1999 (FR) .................................................. 99 02259

(51) Int. Cl.⁷ ............................ A47F 37/10; H01H 19/62
(52) U.S. Cl. ............................ 219/442; 219/507; 200/528
(58) Field of Search .................................. 219/385, 386, 219/442, 489, 507; 200/527, 528; 74/129

(56) References Cited

U.S. PATENT DOCUMENTS

| | | | | |
|---|---|---|---|---|
| 3,204,067 | * | 8/1965 | Brown | 200/527 |
| 3,646,297 | * | 2/1972 | Anthony | 200/528 |
| 4,506,124 | | 3/1985 | Rose et al. | |
| 4,771,141 | * | 9/1988 | Flumigan et al. | 200/528 |
| 4,985,605 | * | 1/1991 | Valenzona | 200/528 |
| 4,996,401 | * | 2/1991 | Park | 200/527 |
| 5,043,546 | * | 8/1991 | Krause | 200/527 |
| 5,145,059 | * | 9/1992 | Park | 200/527 |
| 5,178,265 | * | 1/1993 | Sepke | 200/528 |
| 5,524,527 | * | 6/1996 | Dumoux et al. | 99/333 |
| 5,669,488 | * | 9/1997 | Burger | 200/528 |
| 5,847,345 | * | 12/1998 | Harrison | 200/527 |

FOREIGN PATENT DOCUMENTS

| | | |
|---|---|---|
| 30 22 404 | 12/1981 | (DE) . |
| 77 11720 | 11/1978 | (FR) . |
| 611 542 | 8/1994 | (FR) . |
| 2 738 666 | 3/1997 | (FR) . |

* cited by examiner

*Primary Examiner*—Joseph Pelham
(74) *Attorney, Agent, or Firm*—Browdy and Neimark

(57) ABSTRACT

A control device for an electrical cooking appliance having a case, a bowl and a heating element associated with the bowl. The control device includes a rotatable part mounted for rotation about an axis and supporting elements having indicia and/or arranged to control a power switch and/or to modify a position of a setting element for a temperature or pressure controller, and/or to act through a mechanism on a lock for a lid, a control button mounted for movement in translation parallel to the axis between a rest position, where it is at least approximately flush with an external face of the case, and a depressed position where it is at least partly retracted into the case, first camming surfaces on a surface of the rotatable part that is concentric with the axis, second camming surfaces on a surface of the button that is concentric with the axis and located to interact with the first camming surfaces to provoke a first rotation of the rotatable part during depression of the button from its rest position to its depressed position, third camming surfaces on a surface of the rotatable part that is concentric with the axis, the third camming surfaces being offset with respect to the first camming surfaces, and at least one finger which bears elastically on the second camming surfaces in such a manner as to start a second rotation of the rotatable part during return of the button to its rest position.

8 Claims, 3 Drawing Sheets

CONTROL DEVICE FOR AN ELECTRICAL COOKING APPLIANCE

BACKGROUND OF THE INVENTION

The present invention relates to the general technical field of electrical cooking appliances having a case, a bowl and a heating element associated with the bowl, and relates more particularly to a control device accessible from outside the appliance to allow the user to initiate various functions.

It is known to provide electric fryers having a case forming a housing that opens toward the top and receives a bowl, which may or may not be removable, as well as a lid connected by a hinge to the case in such a manner as to be able to close the bowl from the top, the lid being retained in its closed position by a bolt, or lock, usually located diametrically opposite to the hinge. A control button accessible from the exterior permits the bolt to be unlocked in order to open the lid when desired.

Such a fryer includes, in addition, heating means disposed at the bottom of the housing and an on-off control means for the electric current to the heating means. Such an on-off control means can be a conventional on-off switch which is accessible from the outside, and/or means for controlling the temperature in the bowl. The latter means generally include a thermostat having a part which comes into contact with the bowl and a control element, such as a dial, accessible from the outside to permit selection of the desired cooking temperature.

In known fryers, the control device generally protrudes from the external face of the case, in the form of a large rotatable dial whose initial operating positions permit the on-off switch to be turned on and whose subsequent angular positions permit selection of the desired temperature to which the thermostat is to respond. Alternatively, the control means can be constituted by a lever that is movable within a groove.

These control devices thus have elements that protrude in a significant way from the external face of the case, rendering the latter difficult to clean. This is all the more true when dirt can come to lodge at the bottom of slots, hollows and other cavities, as is particularly true in the case of levers. Moreover, such protruding control means are considered by users to be unsightly.

BRIEF SUMMARY OF THE INVENTION

An object of the present invention is to provide a control device for an electrical cooking appliance composed of a case and a bowl associated with heating means, the control device having a nonobtrusive form while remaining reliable in its operation and inexpensive to fabricate.

This and other objects are achieved by a control device comprising a rotatable part mounted for rotation about an axis, supporting elements having indicia, or markings, and/ or comprising elements arranged to control power switching means and/or arranged to modify a position of a setting element for means for controlling temperature or pressure, and/or arranged to act through a mechanism on a lock for the lid, a control button mounted for movement in translation parallel to the axis of rotation of the rotatable part, in opposition to elastic means, between a rest position, where it is at least approximately flush with an external face of the case, and a depressed position in which it is at least partly retracted into the case, first means defining camming surfaces on a surface of the rotatable part that is concentric with the axis of rotation of the rotatable part, second means defining camming surfaces on a surface of the button that is concentric with the axis of rotation of the rotatable part and being located to interact with the first means in such a manner as to provoke a first rotation of the rotatable part during depression of the button from its rest position to its depressed position, third means defining camming surfaces on a surface of the rotatable part that is concentric with the axis of rotation of rotation of the rotatable part, the third means being offset with respect to the first means, and at least one finger which bears elastically on the third means in such a manner as to start a second rotation of the rotatable part during return of the button to its rest position.

As will be understood, the second rotation then permits shifting of the angular position of the second means arranged on the control button with respect to the first means arranged to be facing on the rotatable part, in such a manner that a subsequent depression of the control button leads to a new rotation of the rotatable part.

As a result of this arrangement, a manually induced control movement from the outside, which in the prior art is usually a movement in translation in the plane of the face of the case, is transformed into a movement in translation perpendicular to the plane of that face.

This then permits the exterior control button to be arranged in such a manner that, at rest, it is at least approximately flush with the plane of the face of the case in order to form therewith a continuous surface. The invention could be implemented with a control button whose outer surface is perfectly flush with the outer surface of the case. However, it is presently considered to be preferable to have the button protrude slightly from the outer surface of the case to enable the user to locate it by touch.

In addition, it is desirable that the outer surface of the button form a smooth continuation of the surrounding portion of the outer surface of the case. The face of the case is thus more watertight and is easier to clean, even when the appliance is in use.

The device according to the invention is particularly advantageous when used on a fryer, because this type of appliance emits relatively fatty vapors which can then fall back onto the outside of the case. The ease of cleaning provided by a control button that is flush with, or at least forms a smooth continuation with, the outer surface of the case is then greatly improved.

Advantageously, the rotatable part is in the form of a ring arranged in a circular depression of a support plate fixed between the outer surface and an internal wall of the case.

If desired, one or several hooks protruding from the plate are engaged in a groove or behind a flange formed on the ring in proximity to the edge thereof which is contact with the plate. These hooks assure that the ring is retained in position to not move relative to the plate in the direction of the axis of rotation, or longitudinal axis, of the ring.

With this new arrangement, there are provided no fewer than two circular faces, one internal and one external, where command elements and the means defining camming surfaces can be provided.

Advantageously then, the first means are provided in the internal or external circular face of the ring, and the elements arranged to act on the on-off means of the heating circuit, or to act on the temperature setting element of the temperature control means, or to act on the mechanism for opening the lid are preferably arranged on the other circular face of the ring. Thus, all interference between, on the one hand, the rotation mechanism of the ring produced by the control button accessible from the outside and, on the other hand, the control elements acting on the different functions of the fryer is avoided.

Advantageously, the on-off control means of the electrical current supply circuit for the heating means include one or several switches whose cases are arranged in proximity to the ring, in such a manner that their actuators, maintained at rest in a protruding position from their case by an internal elastic means, interact with lugs, or projections, of the third means distributed regularly around the perimeter of the external circular face of the ring. This arrangement is characterized by its simplicity, and thus its reliability.

Advantageously, each of the lugs on the ring has a hollow portion at its peak, interacting with the actuator in such a manner as to initiate, or to contribute to initiation of, the second rotation of the rotatable ring during return of the control button of the device to its rest position.

Advantageous use is thus made of the elastic means present in the on-off switches for the heating means, to reinforce the second rotation which permits initialization of the next rotation of the part, or of the ring, during the following depression of the control button that is accessible from the outside.

Advantageously, the control button is present in the form of a cap which is convex toward the exterior and is extended by a continuous portion, or by several portions, which are cylindrical at their periphery and have a height corresponding substantially to the thickness of the external wall of the case of the appliance. The internal edge of the cylindrical peripheral portion or portions is extended by one or several radial flanges coming in contact with the internal face of the external wall of the case of the appliance, when the control button is in its rest position.

Such a cap allows the second means oriented parallel to the axis of rotation of the ring to easily be arranged directly on the perimeter of the cap in such a manner as to face the first means arranged on the rotatable ring. Such a control button can then easily be mass produced at low cost by molding from a thermoplastic material.

Preferably, the cap of the control button is prolonged by one or several arms parallel to the axis of rotation of the part, these arms passing through corresponding openings formed in the support plate. The extremities of these arms have hooks which come to bear against the internal face of the plate. This arrangement prevents rotational movement of the cap relative to the support plate. One or several springs are arranged in a bearing manner between the plate and the internal face of the cap. The spring or springs are disposed either around one of the arms, or are contained in a tube protruding from the internal face of the cap and sliding in a tube protruding from the plate and facing the tube protruding from the internal face of the cap.

Thus, the control button is held efficiently in translation against elastic means, which increases the reliability of its operation.

The invention and its advantages will be better understood from a reading of the following description of an embodiment which is presented only by way of non-limiting example.

DETAILED DESCRIPTION OF THE INVENTION

Figure 1B:
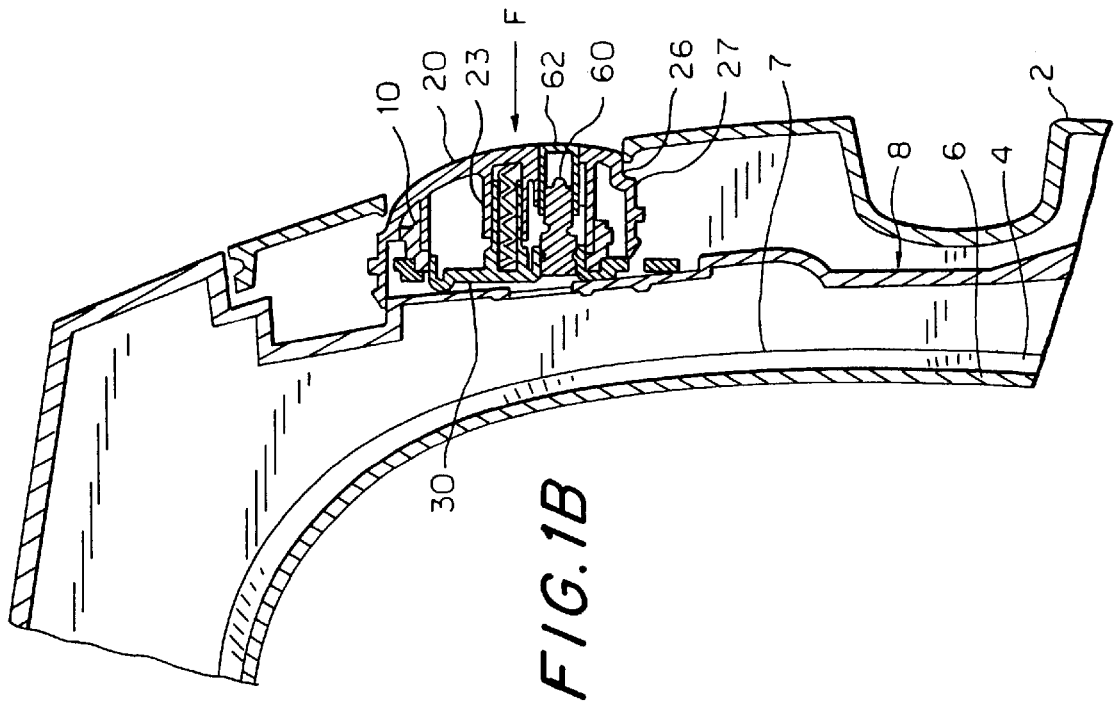
FIGS. 1A and 1B are cross-sectional views of one embodiment of a control device according to the invention, in a horizontal plane through the case of a fryer and through a control button according to the invention, this button being in its rest position in FIG. 1A and in its depressed position in FIG. 1B.
Figure 1A:
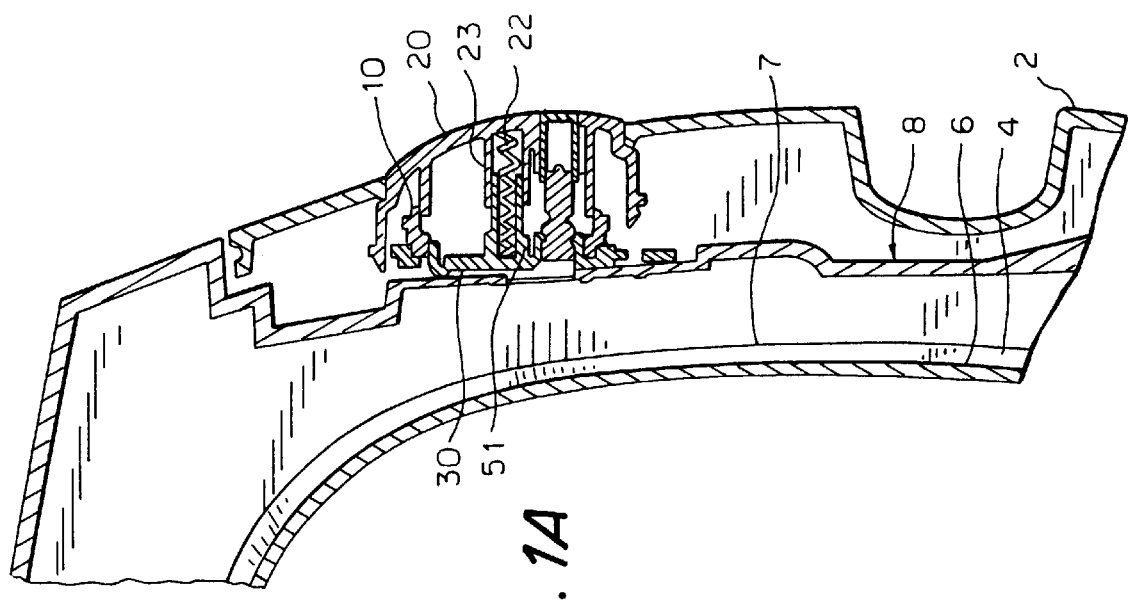

As best shown in FIG. 1A and 1B, one embodiment of a fryer to which the invention is applied includes a case having an external wall 2 and an internal wall 8. A counter-bowl 7 is placed within the case and delimits an internal housing 4 in which is disposed a bowl, or tank, 6. Bowl 6 will hold a quantity of cooking oil or melted fat in which foods will be fried.

More particularly, according to the invention, and as shown most clearly in FIG. 1A, the fryer has at least one control button 20 which is substantially flush with the outer surface of wall 2 so as to avoid creating any significant protrusion.

Figure 2:
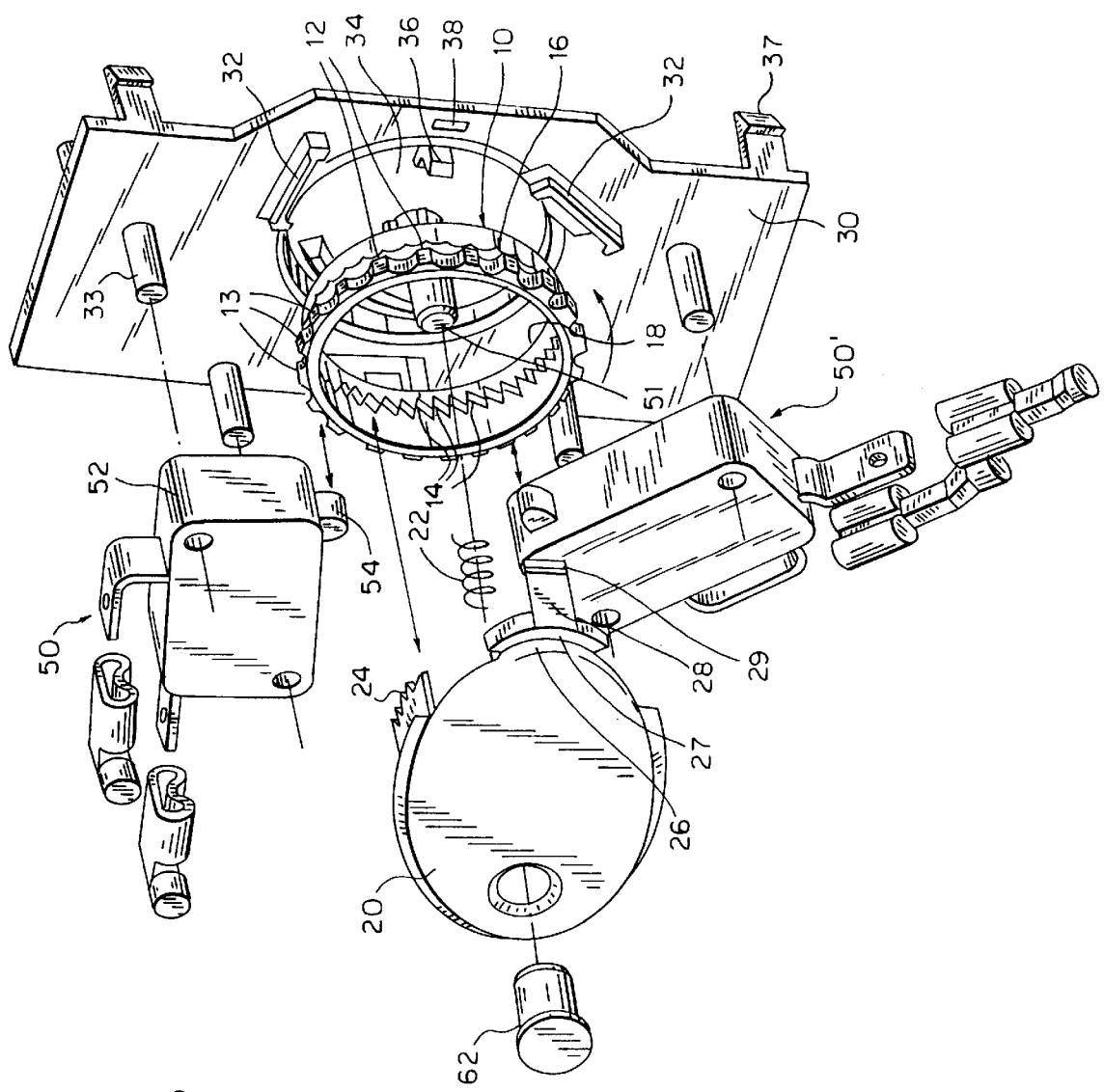
FIG. 2 is an exploded perspective view of the embodiment shown in FIGS. 1.

The mechanism in which button 20 is incorporated is shown in greater detail in FIG. 2.

This mechanism includes, firstly, a substantially flat support plate 30 having integrally formed hooks, or latches, 37 which attach plate 30 to internal wall 8. This plate has a substantially circular central recessed region, or hollow, 34 having a depth of between, for example, 1 and 3 mm and a diameter of, for example, between 25 and 50 mm.

At the external periphery of recessed region 34, there are disposed two flexible hooks 32 whose hook ends are oriented toward the center of recessed region 34.

Furthermore, three flexible hooks 36 are disposed regularly about the internal periphery of recessed region 34 with their hook ends facing radially outwardly. The number of hooks 36 can vary between 2 and 5 and their height is between 2 and 5 mm.

The center of recessed region 34 is provided with a hollow tube 51 protruding from recessed region 34 to a height of 10 to 20 mm.

Support plate 30 is further provided with support posts 33 around recessed region 34.

FIG. 2 further shows openings provided in plate 30 around each of hooks 32 and 36. As will be appreciated by those familiar with molding techniques, these openings allow plate 30 to be easily molded in one piece using thermoplastic material.

A ring 10 is housed in recessed region 34 in a manner to rotate freely about its longitudinal axis. The external diameter of ring 10 is slightly less than that of recessed region 34.

Hooks 36 are disposed to engage in a groove or behind a flange 18 formed on the inner surface of ring 10 at the edge which is in contact with recessed region 34. Hooks 36 restrain ring 10 from translational movement in the direction of its longitudinal axis relative to plate 30.

As is also illustrated in FIG. 2, a first series of ramps 14 is distributed regularly around the internal cylindrical face of ring 10 in a region slightly above groove or flange 18 in the direction of the longitudinal axis of ring 10. Ramps 14 have active faces, or edges, which are inclined to the longitudinal axis of ring 10 and constitute small, identical segments of adjacent spirals. As shown, there can be between 30 and 40 ramps 14 with a height of the order of 3 mm. Ramps 14 constitute first means defining camming surfaces.

On the external cylindrical face of ring 10 there are provided, in proximity to the edge which is in contact with recessed region 34, a second regular series of ramps or recesses 16 which are disposed to interact with, or fingers, hooks 32, as will be discussed in greater detail below. The number of ramps or recesses 16 is identical to the number of ramps 14.

The external cylindrical face of ring 10 is further provided with a series of identical actuating lugs 12 distributed around the periphery of, and protruding radially from, ring 10. In the case illustrated, the number of lugs is one-half the number of ramps 14. The height of lugs 12 can be of the order of 3 to 6 mm. In particular, the peak, or outer end, of each lug 12 is formed to have a slight depression, or hollow, 13. If desired, one or several parallel series of lugs 12 can be arranged on the external cylindrical face of ring 10 at locations that are spaced apart along the axis of rotation of ring 10.

Posts 33 support switches 50 and 50'. Each of these switches has a case 52 and an actuator 54 which protrudes from its respective case. Each of switches 50, 50' is positioned so that its respective actuator 54 will interact with lugs 12. Depending on the operations to be performed, the actuator of each of the switches can be disposed to interact with a respective one of two series of lugs 12, the lugs of one series being offset in the direction of the longitudinal axis of ring 10 from the lugs of the other series. In addition, the lugs of one series can be angularly offset from the lugs of the other series and each series of lugs can have peaks with respectively different lengths in the peripheral direction of ring 10.

The control device is completed by button 20 which has the form of a cap that is convex toward the exterior and that includes a cylindrical part which has a diameter substantially equal to that of ring 10. As illustrated in the drawings, the periphery of button 20 includes cylindrical portions 26 which extend from portions of radial flanges 27 oriented radially outwardly.

Button 20 also has a pair of arms 28 oriented parallel to the axis of rotation of ring 10 and to the direction of movement, F, of button 20. Arms 28 pass through openings 38 and are provided at their ends with hook ends 29 which engage behind openings 38 to hold button 20 in place with respect to internal wall 8. As shown, arms 28 are preferably arranged at the extremity of portions of radial flanges 27. Engagement of arms 28 in openings 38 acts to prevent rotational movement of button 20 about the longitudinal axis of ring 10.

More particularly according to the invention, button 20 also includes several series of notches 24 substantially identical in structure to ramps 14. Ramps 14 and notches 24 are oriented to face one another. Notches 24 constitute second means defining camming surfaces, while ramps or recesses 16 constitute third means defining camming surfaces A spring 22 arranged inside or around tube 51 of plate 30 bears on the one hand against plate 30 and on the other hand against the internal face of button 20 in order to urge button 20 toward the outside, and thus toward its rest position.

The above-described control device operates in the following manner.

In FIG. 1A, button 20 is in its rest position, button 20 being urged into this position by being pushed by spring 22 toward the exterior of the fryer. In the rest position, the outer surface of button 20 is substantially flush with the external face of wall 2 and radial portions of flanges 27 come to bear against the internal face of wall 2 in order to define the rest position of button 20. Actuators 54 of switches 50, 50' are each assumed to be initially situated between two lugs 12 of ring 20, so that both switches are open-circuited and the heating means are thus not supplied with current.

If the user depresses button 20 in translation in the direction of arrow F into the position shown in FIG. 1B, then notches 24 of button 20 come in contact with ramps 14 and their interaction imposes a rotational movement on ring 10. The amplitude of this movement in response to a single depression of button 20 is defined by the circumferential dimension of each ramp 14 and notch 24 and in the illustrated embodiment is of the order of 10°.

This rotation induced in ring 10 brings a lug 12 against actuator 54 of at least one of switches 50, 50', depressing that actuator as it moves along the camming surface constituted by the lateral face of that lug. The corresponding switch is thus actuated. In the illustrated embodiment, it can be assumed that actuators 54 of both switches 50 and 50" are actuated simultaneously.

When the user releases button 20, spring 22 urges button 20 back into its rest position.

At the same time, each hook 32 will then be located just at the periphery of a ramp or hollow 16, which is shaped to cause the engagement of each hooks 32 therewith to create an additional rotation of ring 10 until hooks 32 come to engage in the bottom of ramps or hollows 16. This additional rotational movement is equally assisted by restoring forces imposed on actuators 54 by biasing means located within cases 52. These restoring forces on actuators 54 tend to cause each actuator 54 which is engaging a lug 12 to descend to the bottom of the associated depression 13 at the peak of the lug 12 with which the actuator 54 engages.

The new angular position of ring 10 thus becomes stable. Above all, notches 24 are now found opposite a new series of ramps 14.

A subsequent depression of button 20 then induces a second rotation of ring 10, causing each actuator 54 which was engaging in a depression 13 to move out of that depression and down the trailing slope of the associated lug 12 until reaching the recess between two of the lugs 12. This returns the associated switches to their deactuated positions. Then, button 20 is permitted to return to its rest position, where it is substantially flush with the external face of wall 2.

It should be apparent from the above description that one can easily actuate and deactuate the heating circuit simply by successive depressions of button 20 and that depression of an actuator 54 of either switch 50, 50' can act to either open or close an associated circuit.

To cite one example of a system employing two switches 50 and 50', switch 50 can be connected to open and close a circuit supplying electric current to heating means of the fryer, while the other switch 50' can activate or deactivate a thermostatic temperature regulation circuit for bowl 6.

Figure 3:
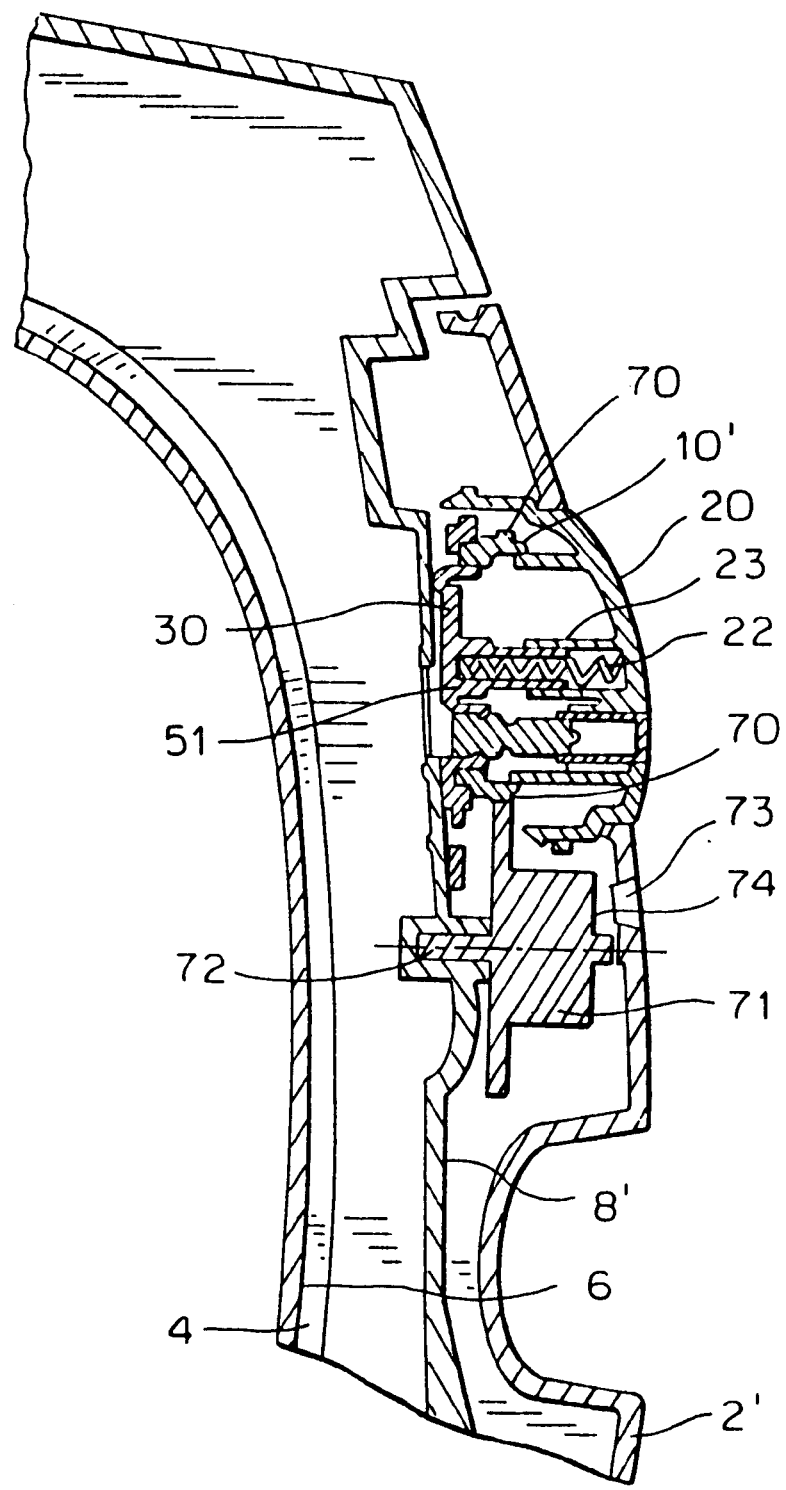
FIG. 3 is a view similar to those of FIGS. 1A and 1B of a second embodiment of a control device according to the invention.

FIG. 3 shows a second embodiment of a control device according to the invention which includes all of the components of the embodiment described above, with the following differences. Ring 10 is replaced by a ring 10' which carries, in addition to the elements described with respect to FIGS. 1 and 2, a series of lugs 70 on its outer circular face. These lugs engage, in the manner of a gear train, with a toothed wheel 71 which carries a supporting pin 72 that is mounted in a cylindrical recess formed in inner wall 8' of the appliance case. Pin 72 defines an axis of rotation for wheel 71. Wheel 71 has a frontal face 74 on which suitable indicia, such as desired temperature values, are provided. Outer wall 2' of the appliance case is provided with a window 73 via which an indication of a particular value can be observed by the user.

According to an alternative feature of the invention, which is not illustrated, toothed-wheel 71 can cooperate via a further gear system with a rotatable control dial for regulating the setting of a thermostat to a desired temperature.

According to another optional feature, not illustrated, the series of lugs 70 provided on the outer circular face of ring 10' can engage with another toothed wheel or wheels which control the operation of a mechanism for locking and unlocking a lid forming part of the appliance.

It can also envisioned that another series of lugs provided on the external face of ring 10 could engage a toothed wheel or wheels forming part of a mechanism for locking or unlocking the lid of the fryer.

It should be understood that actuators 54 of both switches 50, 50' could cooperate with the same series of lugs 12, or ring 10 could be provided with two series of lugs which are spaced from one another as described earlier herein and each of which cooperates with a respective actuator 54. In this case, the lugs of one series could be angularly offset from the lugs of the other series.

As will be noted from the description presented above, the control device according to the invention provides a control button which is accessible from the outside and which operates solely by undergoing translational movements perpendicular to the wall of the appliance in such a manner that, in the rest position, the button returns to a level which is flush with the outer wall of the appliance. The result is that the appliance has a more pleasing appearance and its outer surface is easier to clean. Indeed, it is practically impossible for dirt to be trapped between external wall 2 and button 20.

Plate 30 can also carry a LED 60 which is connected to be illuminated when either one of switches 50 and 50' is closed and button 20 can carry a hollow tubular element 62 having a transparent or translucent base that serves as a window via which illumination of LED 60 can be observed. Element 62 will slide relative to LED 60 when button 20 is moved between its rest position and its depressed position.

According to another possibility, the control device according to the invention can be adapted to an appliance in which a pressure is to be established, such as a steam cooker or a rice cooker. In this case, a control device according to the invention could be mounted in the lid of the appliance in order to actuate and control pressure control means.

This application relates to subject matter disclosed in French patent application FR-99-02259, filed Feb. 19, 1999, the entirety of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A control device for an electrical cooking appliance having a case, a bowl and a heating element associated with the bowl, said control device comprising:

a rotatable part mounted for rotation about an axis of rotation, said rotatable part comprising at least one of: elements carrying indicia; elements arranged to control power switching means; elements arranged to modify a position of a setting element for controlling temperature or pressure; and elements arranged to act through a mechanism on a lock for lid of the appliance;

a control button mounted for movement in translation parallel to the axis of rotation of said rotatable part, in opposition to elastic means, between a rest position, where said button is at least approximately flush with an external face of the case, and a depressed position in which said button is at least partly retracted into the case, and said control button has an opening or a transparent zone facing a zone of said rotatable part;

first means defining camming surfaces on a surface of said rotatable part that is concentric with the axis of rotation of said rotatable part, second means defining camming surfaces on a surface of said button that is concentric with the axis of rotation of said rotatable parts, said camming surfaces of said second means being located to interact with said camming surfaces of said first means in such a manner as to provoke a first rotation of said rotatable part during depression of said button from the rest position of the depressed position, third means defining camming surfaces on a surface of said rotatable part that is concentric with the axis of rotation of said rotatable part, said third means being offset with respect to said first means, and at least one finger which bears elastically on said third means in such a manner as to start a second rotation of said rotatable part during return of said button from the depressed position to the rest position.

2. A control device for an electrical cooking appliance having a case, a bowl and a heating element associated with the bowl, said control device comprising:

a rotatable part mounted for rotation about an axis of rotation, said rotatable part comprising at least one of: elements carrying indicia; elements arranged to control power switching means; elements arranged to modify a position of a setting element for controlling temperature or pressure; and elements arranged to act through a mechanism on a lock for lid of the appliance;

a control button mounted for movement in translation parallel to the axis of rotation of said rotatable part, in opposition to elastic means, between a rest position, where said button is at least approximately flush with an external face of the case, and a depressed position in which said button is at least partly retracted into the case;

first means defining camming surfaces on a surface of said rotatable part that is concentric with the axis of rotation of said rotatable part, second means defining camming surfaces on a surface of said button that is concentric with the axis of rotation of said rotatable parts, said camming surfaces of said second means being located to interact with said camming surfaces of said first means in such a manner as to provoke a first rotation of said rotatable part during depression of said button from the rest position of the depressed position, third means defining camming surfaces on a surface of said rotatable part that is concentric with the axis of rotation of said rotatble part, said third means being offset with respect to said first means, at least one finger which bears elastically on said third means in such a manner as to start a second rotation of said rotatable part during return of said button from the depressed position to the rest position, and a support plate having a circular depression, and wherein said rotatable part is a ring that is retained in said circular depression, and said support plate is fixed between an external wall and an internal wall of the case.

3. The control device of claim 2 further comprising at least one hook protruding from said support plate and engaging said ring in order to prevent movement of said ring in a direction parallel to the axis of rotation of said ring.

4. The control device of claim 3 wherein said ring has an internal cylindrical face and an external cylindrical face, said first means defining camming surfaces are disposed on one of the cylindrical faces of said ring, and said elements are disposed on the other one of the cylindrical faces of said ring.

5. The control device of claim 2 wherein the appliance includes means for turning on and off a current supply circuit for the heating means and composed of at least one switch having a case disposed in proximity to said ring and having an actuator which is positioned to interact with said elements for movement between an actuated condition and a deactuated condition in response to rotation of said ring relative to the switch.

6. The control device of claim 5 wherein said elements are a series of lugs distributed regularly around the external face of said ring.

7. The control device of claim 6 wherein each of said lugs has a peak provided with a depression formed to interact with said actuator.

8. A control device for an electrical cooking appliance having a case, a bowl and a heating element associated with the bowl, said control device comprising:

a rotatable part mounted for rotation about an axis of rotation, said rotatable part comprising at least one of: elements carrying indicia; elements arranged to control power switching means; elements arranged to modify a position of a setting element for controlling temperature or pressure; and elements arranged to act through a mechanism on a lock for lid of the appliance;

a control button mounted for movement in translation parallel to the axis of rotation of said rotatable part, in opposition to elastic means, between a rest position, where said button is at least approximately flush with an external face of the case and a depressed position in which said button is at least partly retracted into the case;

first means defining camming surfaces on a surface of said rotatable part that is concentric with the axis of rotation of said rotatable part, second means defining camming surfaces on a surface of said button that is concentric with the axis of rotation of said rotatable parts, said camming surfaces of said second means being located to interact with said camming surfaces of said first means in such a manner as to provoke a first rotation of said rotatable part during depression of said button from the rest position of the depressed position, third means defining camming surfaces on a surface of said rotatable part that is concentric with the axis of rotation of said rotatable part, said third means being offset with respect to said first means, and at least one finger which bears elastically on said third means in such a manner as to start a second rotation of said rotatable part during return of said button from the depressed position to the rest position;

wherein the case of the appliance has an exterior wall having a thickness, said control button has an exterior portion in the form of a cap which is convex toward the outside of the appliance, said control button further includes at least one peripheral cylindrical portion surrounding said cap and having a height substantially equal to the thickness of the exterior wall, said peripheral cylindrical portion has an internal edge remote from said cap, and said control button further includes at least one radial flange extending from the internal edge of said peripheral cylindrical portion and contacting an internal face of the exterior wall when said control button is in the rest position;

said control device further comprising a support plate fixed between the external wall and an internal wall of the case, and wherein said control button further includes at least one arm extending parallel to the axis of rotation of said rotatable part and extending through an opening provided in said support plate, said arm having a hook end which engages with said support plate behind said opening, and wherein said control device further comprises at least one restoring spring disposed between said support plate and said control button.

* * * * *